(12) United States Patent
Markusic

(10) Patent No.: US 11,828,314 B1
(45) Date of Patent: Nov. 28, 2023

(54) CLAMPING DEVICE AND A CLAMPING SYSTEM USING THE SAME

(71) Applicant: Frank Richard Markusic, Galloway, OH (US)

(72) Inventor: Frank Richard Markusic, Galloway, OH (US)

(*) Notice: Subject to any disclaimer, the term of this patent is extended or adjusted under 35 U.S.C. 154(b) by 0 days.

(21) Appl. No.: 17/877,640

(22) Filed: Jul. 29, 2022

Related U.S. Application Data

(63) Continuation of application No. 17/092,143, filed on Nov. 6, 2020, now Pat. No. 11,401,960.

(60) Provisional application No. 62/932,376, filed on Nov. 7, 2019.

(51) Int. Cl.
*F16B 2/10* (2006.01)
*F16B 2/18* (2006.01)

(52) U.S. Cl.
CPC ............. *F16B 2/10* (2013.01); *F16B 2/185* (2013.01); *Y10T 24/1418* (2015.01)

(58) Field of Classification Search
CPC ......... Y10T 24/44521; Y10T 24/44513; Y10T 24/44342; Y10T 24/44333; Y10T 24/44256; Y10T 24/44017; Y10T 24/1418; F16L 33/12; F16B 2/10; F16B 2/185
See application file for complete search history.

(56) References Cited

U.S. PATENT DOCUMENTS

| | | |
|---|---|---|
| 4,041,931 A | 8/1977 | Elliott et al. |
| 4,296,534 A | 10/1981 | Nagano |
| 4,905,950 A | 3/1990 | Turner et al. |
| 4,917,421 A | 4/1990 | Wightman et al. |
| 5,271,649 A | 12/1993 | Gromotka |
| 5,390,443 A | 2/1995 | Emalfarb et al. |
| 7,089,710 B2 | 8/2006 | Nicholson |
| 7,275,728 B1 | 10/2007 | Branson |
| D653,529 S | 2/2012 | Tomasi et al. |
| 8,413,714 B2 | 4/2013 | Nie et al. |
| 8,561,345 B2 | 10/2013 | Armas |
| 9,107,496 B2 | 8/2015 | Lindo et al. |
| 9,261,211 B2 | 2/2016 | Schooley et al. |
| 2013/0075540 A1 | 3/2013 | Hammond et al. |
| 2017/0015465 A1 | 1/2017 | Raupach |

FOREIGN PATENT DOCUMENTS

EP  0907857 B1  2/2001

*Primary Examiner* — Robert Sandy
*Assistant Examiner* — Michael S Lee
(74) *Attorney, Agent, or Firm* — The Law Office of Patrick F. O'Reilly III, LLC

(57) ABSTRACT

A clamping device and a clamping system using the same are disclosed herein. The clamping device includes a first clamp component formed from bent wire configured to partially circumscribe a pole, and including at least one offset portion for defining an accessory receiving space between the first clamp component and a sidewall of the pole; a second clamp component rotatably coupled to the first clamp component, formed from bent wire, and configured to partially circumscribe the pole; and a handle component configured to couple the second clamp component to the first clamp component. When the handle component is rotated in a first tightening direction, the first clamp component and the second clamp component are brought into secure engagement about the circumference of the pole. When the handle component is rotated in a second loosening direction, the clamping device is capable of being disengaged from the pole.

17 Claims, 15 Drawing Sheets

Detail "A"

Section A-A

Detail "B"

US 11,828,314 B1

CLAMPING DEVICE AND A CLAMPING SYSTEM USING THE SAME

CROSS-REFERENCE TO RELATED APPLICATIONS

This is a continuation of U.S. patent application Ser. No. 17/092,143, entitled "Clamping Device", filed on Nov. 6, 2020, and further claims the benefit of U.S. Provisional Patent Application No. 62/932,376, entitled "Clamping Device", filed on Nov. 7, 2019, the disclosures of each of which are hereby incorporated by reference as if set forth in their entireties herein.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a clamping device. More particularly, the invention relates to a clamping device for securing an accessory to a pole.

2. Background

In various applications, it is desirable to attach accessories to a vertical or horizontal pole in order to support these accessories above a floor surface. In one such application, it may be desirable to support potted plants on a vertical pole. However, conventional clamps used for these applications have numerous limitations and drawbacks. For example, in order to engage most conventional clamps with a pole, a user must have access to the ends of the pole. As another example, many conventional clamps require the tightening of a fastener in order to be secured to a pole, and thus, necessitate the use of tools for the installation of the clamp. As yet another example, some conventional clamps require the modification of the pole for installation, which makes the installation of the clamp particularly burdensome.

Therefore, what is needed is a clamping device that is capable of being used for supporting, suspending, and securing many different types of accessories to a pole. Moreover, a clamping device is needed that is capable of being singularly and temporarily attached to a pole. Furthermore, there is a need for a clamping device that is capable of being attached to a pole without access to the ends of the pole, modification of the pole, or tools of any kind.

BRIEF SUMMARY OF EMBODIMENTS OF THE INVENTION

Accordingly, the present invention is directed to a clamping device that substantially obviates one or more problems resulting from the limitations and deficiencies of the related art.

In accordance with one or more embodiments of the present invention, there is provided a clamping device for securing an accessory to a pole, the clamping device includes a first clamp component formed from bent wire, the first clamp component configured to partially circumscribe a pole, and the first clamp component including at least one offset portion for defining an accessory receiving space between the first clamp component and a sidewall of the pole; a second clamp component rotatably coupled to the first clamp component, the second clamp component formed from bent wire, and the second clamp component configured to partially circumscribe the pole; and a handle component configured to couple the second clamp component to the first clamp component; wherein, when the handle component is rotated in a first tightening direction, the first clamp component and the second clamp component are brought into secure engagement about the circumference of the pole; and wherein, when the handle component is rotated in a second loosening direction, the clamping device is capable of being disengaged from the pole.

In a further embodiment of the present invention, the first clamp component further comprises a first looped end portion, and the second clamp component further comprises a second looped end portion, and wherein the second clamp component is rotatably coupled to the first clamp component by means of the engagement between the second looped end portion and the first looped end portion.

In yet a further embodiment, the first clamp component further comprises at least one first bent end portion, and the second clamp component further comprises at least one second bent end portion, wherein the handle component is rotatably coupled to the at least one second bent end portion of the second clamp component, and wherein the handle component is configured to be removably engaged with the at least one first bent end portion of the first clamp component so as to couple the second clamp component to the first clamp component about the pole.

In still a further embodiment, the handle component further comprises a pivot rod portion, the pivot rod portion of the handle component rotatably coupled to the at least one second bent end portion of the second clamp component.

In yet a further embodiment, the handle component further comprises at least one looped portion, the at least one first bent end portion of the first clamp component configured to be engaged with the at least one looped portion of the handle component during the securement of the clamping device on the pole.

In still a further embodiment, the handle component further comprises at least one rear support tab portion, the at least one second bent end portion of the second clamp component rotatably coupled to the at least one rear support tab portion of the handle component.

In yet a further embodiment, the handle component further comprises at least one outwardly protruding tab portion, the at least one first bent end portion of the first clamp component configured to be engaged with the at least one outwardly protruding tab portion of the handle component.

In still a further embodiment, the at least one offset portion of the first clamp component comprises a plurality of offset portions, each of the plurality of offset portions defining a respective accessory receiving space for receiving an attachment portion of an accessory.

In yet a further embodiment, the clamping device further comprises a locking pin member configured to be inserted between the first clamp component and the second clamp component, the locking pin member configured to prevent the handle component from being rotated in the second loosening direction so as to prevent the clamping device from being disengaged from the pole.

In still a further embodiment, the locking pin member comprises an inner pin portion and an outer grasping portion, the inner pin portion of the locking pin member configured to be inserted between the first clamp component and the second clamp component, and the outer grasping portion of the locking pin member configured to be grasped by a user to facilitate an insertion of the locking pin member into the clamping device, or removal of the locking pin member from the clamping device.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
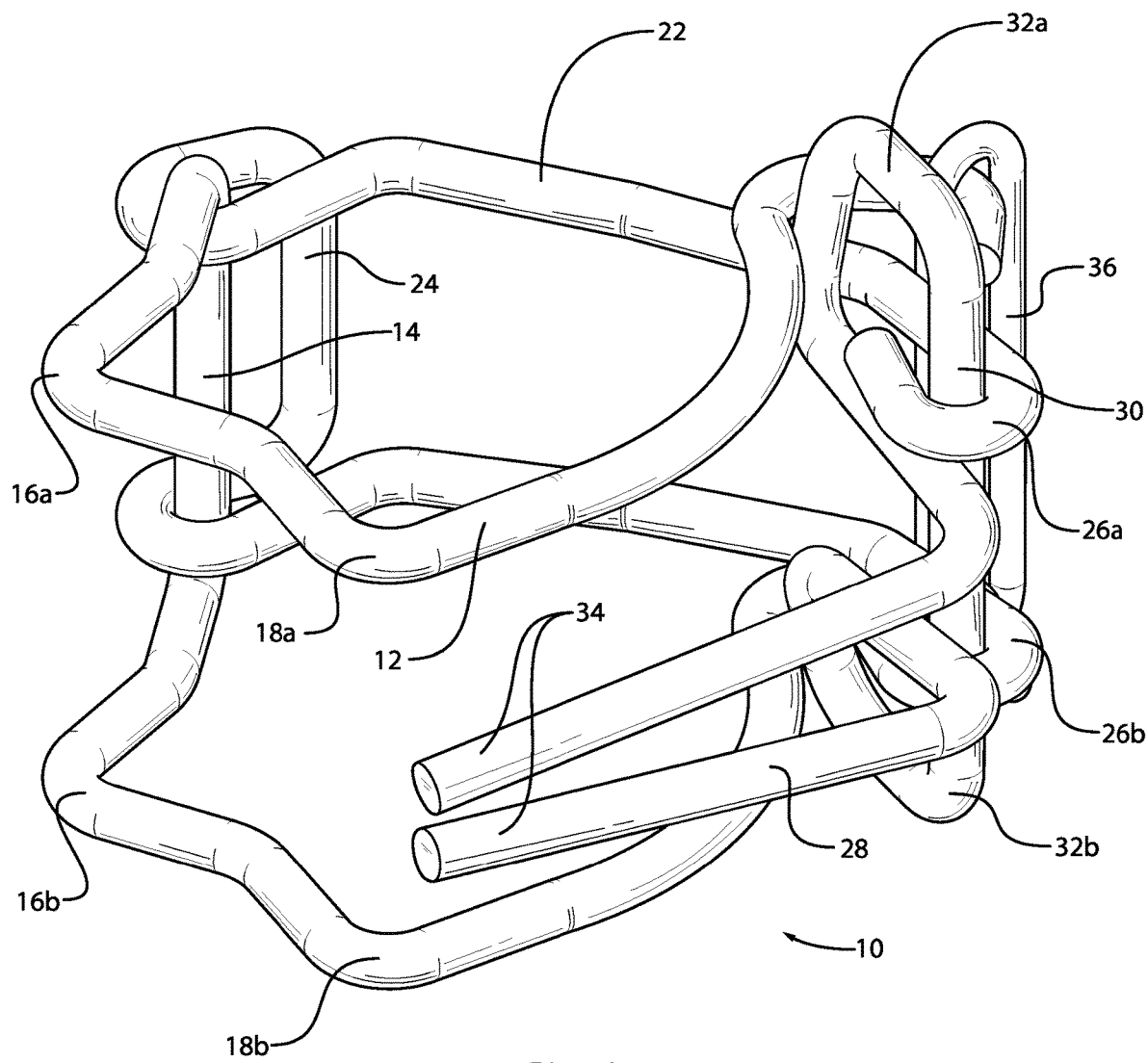
FIG. 1 is a perspective view of a clamping device, according to an illustrative embodiment of the invention.
Figure 2:
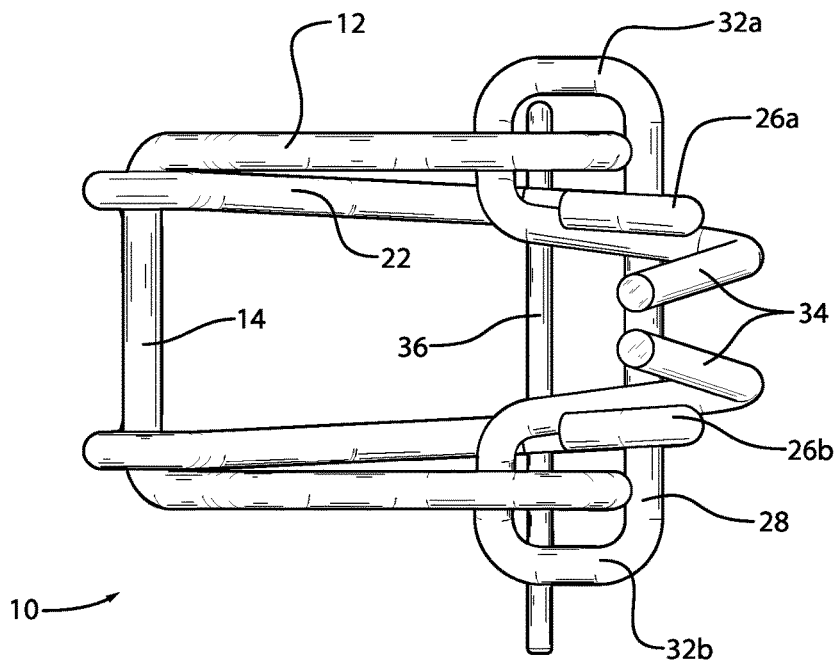
FIG. 2 is a first side elevational view of the clamping device of FIG. 1.
Figure 3:
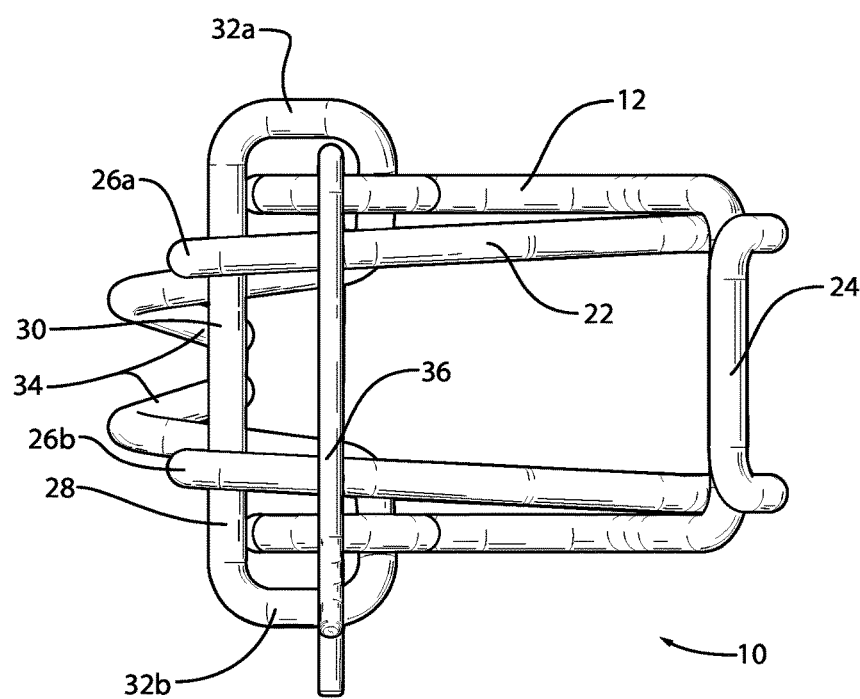
FIG. 3 is a second side elevational view of the clamping device of FIG. 1.
Figure 4:
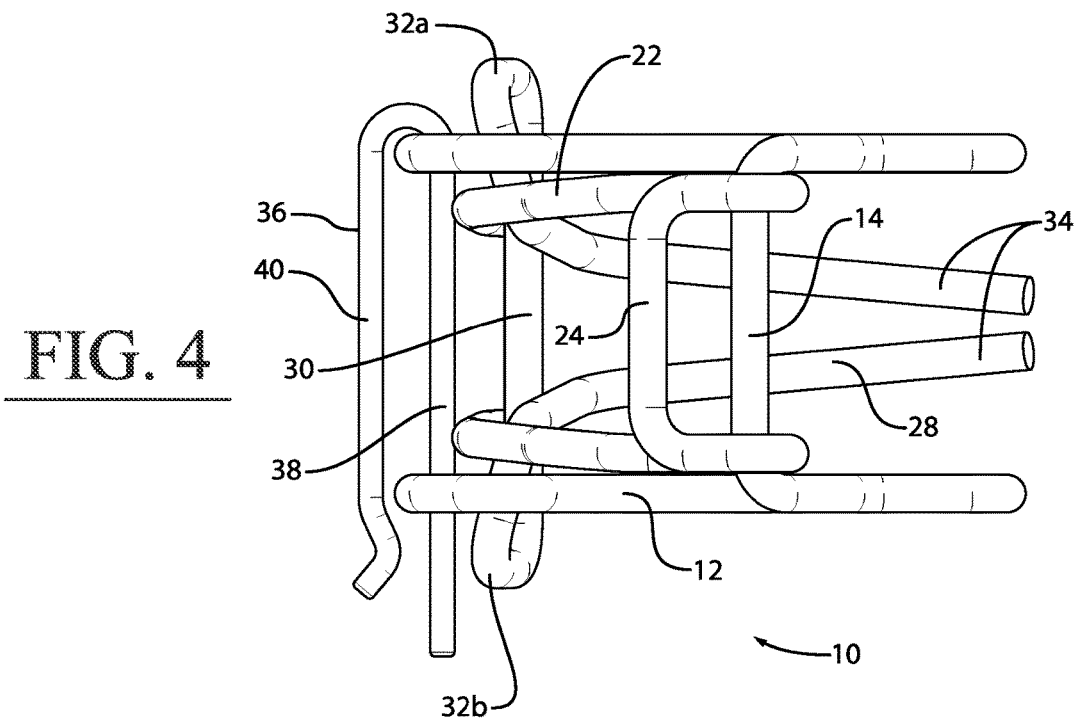
FIG. 4 is a rear elevational view of the clamping device of FIG. 1.
Figure 5:
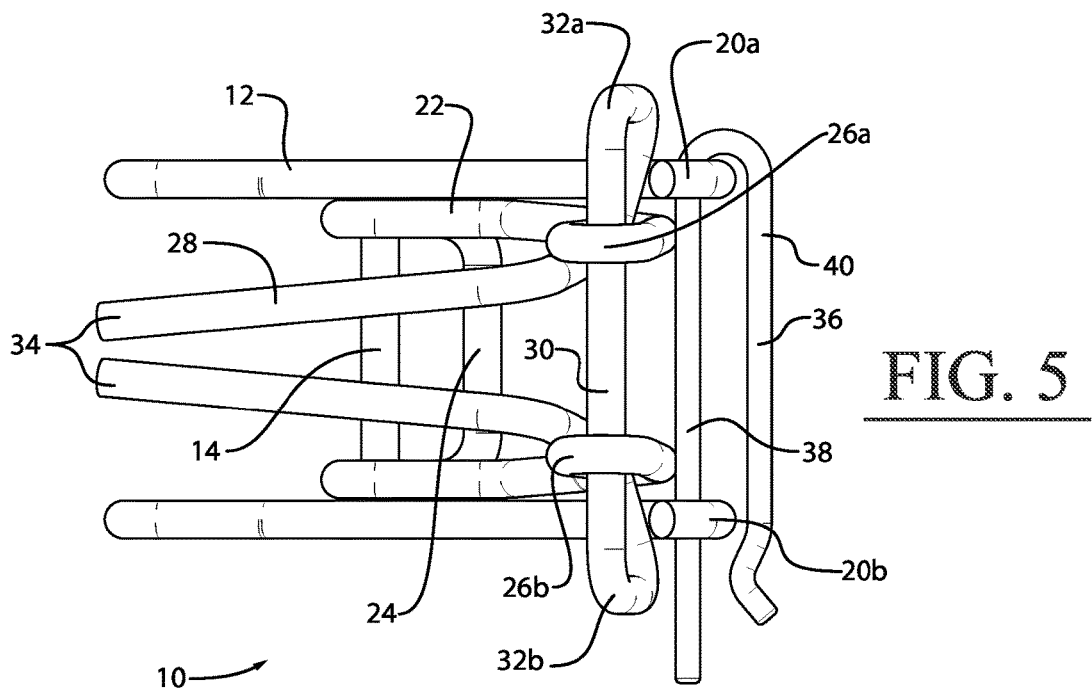
FIG. 5 is a front elevational view of the clamping device of FIG. 1.
Figure 6:
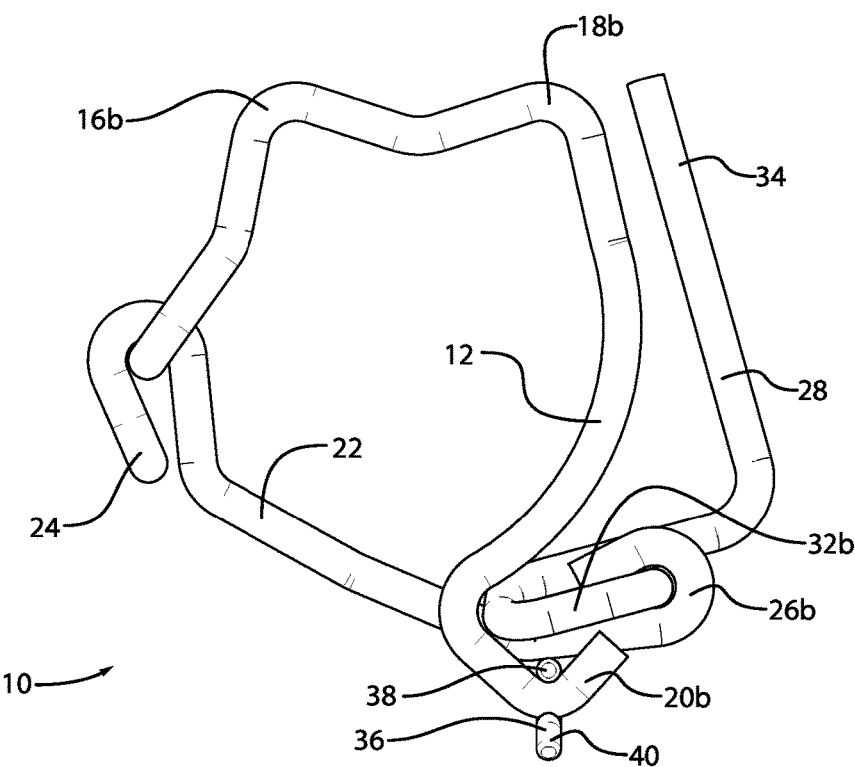
FIG. 6 is a bottom plan view of the clamping device of FIG. 1.
Figure 7:
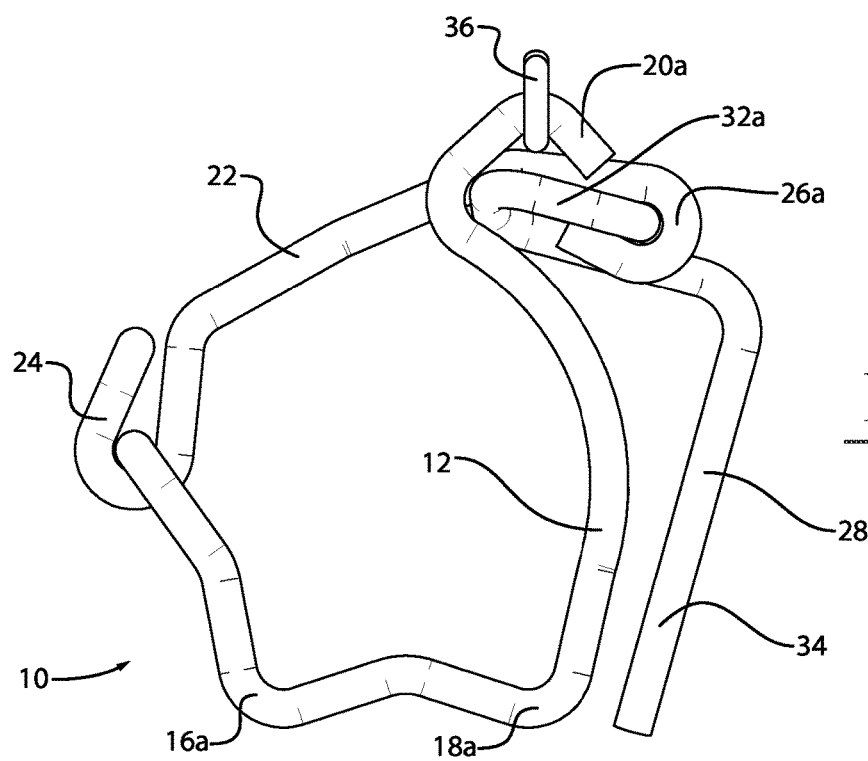
FIG. 7 is a top plan view of the clamping device of FIG. 1.

An illustrative embodiment of a clamping device is seen generally at 10 in FIGS. 1-12. The clamping device 10 is used for securing an accessory 54, 58, 68 to a pole 42 (see e.g., FIGS. 13 and 16). With initial reference to FIGS. 1 and 8, it can be seen that the clamping device 10 generally comprises a first clamp component 12 formed from bent wire, the first clamp component 12 configured to partially circumscribe a pole 42 (see e.g., FIG. 12), and the first clamp component 12 including at least one offset portion 16a, 16b, 18a, 18b for defining an accessory receiving space 50, 52 between the first clamp component 12 and a sidewall of the pole 42 (refer to FIG. 12); a second clamp component 22 rotatably coupled to the first clamp component 12, the second clamp component 22 formed from bent wire, and the second clamp component 22 configured to partially circumscribe the pole 42 (see FIG. 12); and a handle component 28 configured to couple the second clamp component 22 to the first clamp component 12; wherein, when the handle component 28 is rotated in a first tightening direction 44, 46 (refer to FIGS. 10 and 11), the first clamp component 12 and the second clamp component 22 are brought into secure engagement about the circumference of the pole 42; and wherein, when the handle component 28 is rotated in a second loosening direction (opposite to 44, 46), the clamping device 10 is capable of being disengaged from the pole 42. In the illustrative embodiment, the first clamp component 12 is in the form of a bale component formed from a piece of bent wire (refer to FIG. 8), while the second clamp component 22 is in the form of a hook component formed from a piece of bent wire (see FIG. 8).

Figure 8:
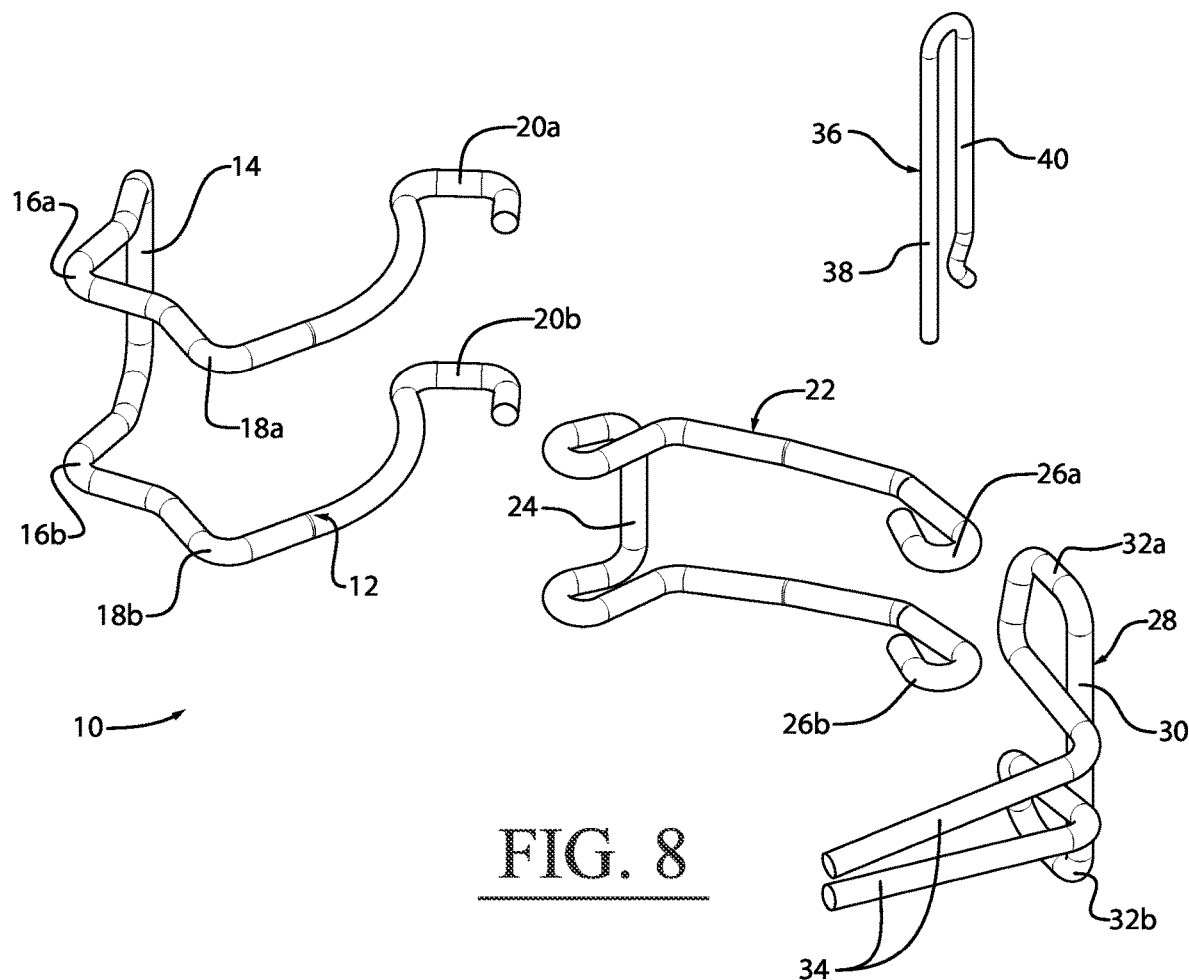
FIG. 8 is an exploded perspective view of the clamping device of FIG. 1.

Now, with reference primarily to FIGS. 1 and 8, it can be seen that, in the illustrative embodiment, the first clamp component 12 further comprises a first looped end portion 14, and the second clamp component 22 further comprises a second looped end portion 24. The second clamp component 22 is rotatably coupled to the first clamp component 12 by means of the engagement between the second looped end portion 24 and the first looped end portion 14. That is, together the first and second looped end portions 14, 24 form a hinge so that the second looped end portion 24 of the second clamp component 22 is able to rotate about the first looped end portion 14 of the first clamp component 12.

Figure 21:
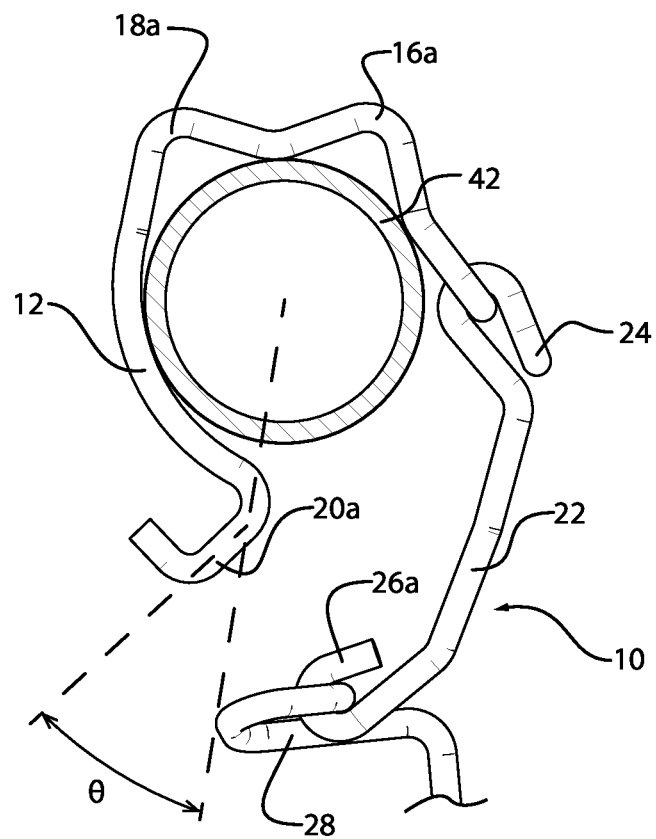
FIG. 21 is still another top plan view of the clamping device of FIG. 1 illustrating an angle of the bent end portion of the first clamp component relative to a reference line passing through the center of the pole.

Turning again to FIGS. 1 and 8, in the illustrative embodiment, the first clamp component 12 further comprises a first pair of bent end portions 20a, 20b, and the second clamp component 22 further comprises a second pair of bent end portions 26a, 26b. The handle component 28 is rotatably coupled to the second pair of bent end portions 26a, 26b of the second clamp component 22, and the handle component 28 is configured to be removably engaged with the first pair of bent end portions 20a, 20b of the first clamp component 12 so as to couple the second clamp component 22 to the first clamp component 12 about the pole 42 (see FIGS. 10 and 11). As shown in FIG. 21, the bent end portions 20a, 20b of the first clamp component 12 may form an angle θ relative to a reference line passing through the center point of the pole 42. The angle θ is important because the proper selection of this angle θ helps to produce the cam closing pressure described hereinafter. In one exemplary embodiment, the angle θ may be in a range between 30 degrees and 50 degrees, inclusive. More specifically, in one exemplary embodiment, the angle θ may be approximately equal to 40 degrees.

As shown in the illustrative embodiment of FIGS. 1 and 8, the handle component 28 further comprises a pivot rod portion 30. The pivot rod portion 30 of the handle component 28 is rotatably coupled to the second pair of bent end portions 26a, 26b of the second clamp component 22 (see FIGS. 1 and 3). Also, in the illustrative embodiment, referring to FIGS. 1 and 8, it can be seen that the handle component 28 further comprises first and second looped portions 32a, 32b. The first pair of bent end portions 20a, 20b of the first clamp component 12 are configured to be engaged with the first and second looped portions 32a, 32b of the handle component 28 during the securement of the clamping device 10 on the pole 42. In the illustrative embodiment of FIGS. 1-17, the handle component 28 is formed from bent wire with the free ends 34 of the wire forming the grasping portion of the handle 28. However, in other embodiments, different styles of handle components may be used with the clamping device 10. For example, as will be described hereinafter with reference to FIGS. 18-20, a stamped handle component 74 may be used with the clamping device. In yet other embodiments, the first and second looped portions 32a, 32b of the handle component 28 may be provided with chamfered outside corners adjacent to the pivot rod in order to provide cam action during the closing of the clamping device 10 by a user.

Figure 18:
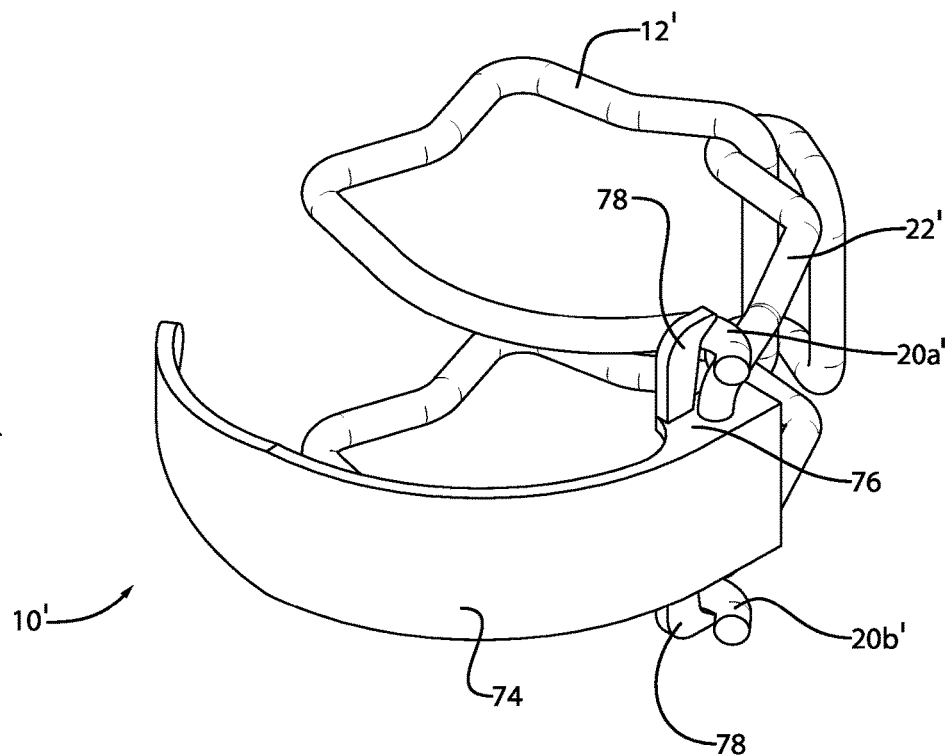
FIG. 18 is a frontal perspective view of another clamping device, according to an alternative embodiment of the invention, wherein the clamping device is provided with a different type of handle component.
Figure 19:
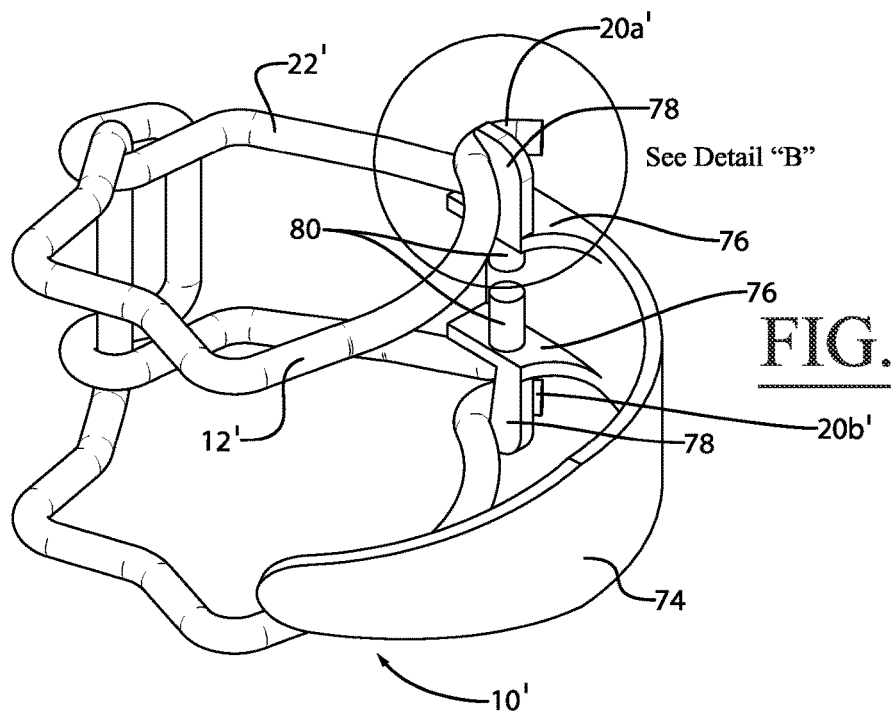
FIG. 19 is a rear perspective view of the clamping device of FIG. 18, wherein the rear side of the handle component is illustrated.
Figure 20:
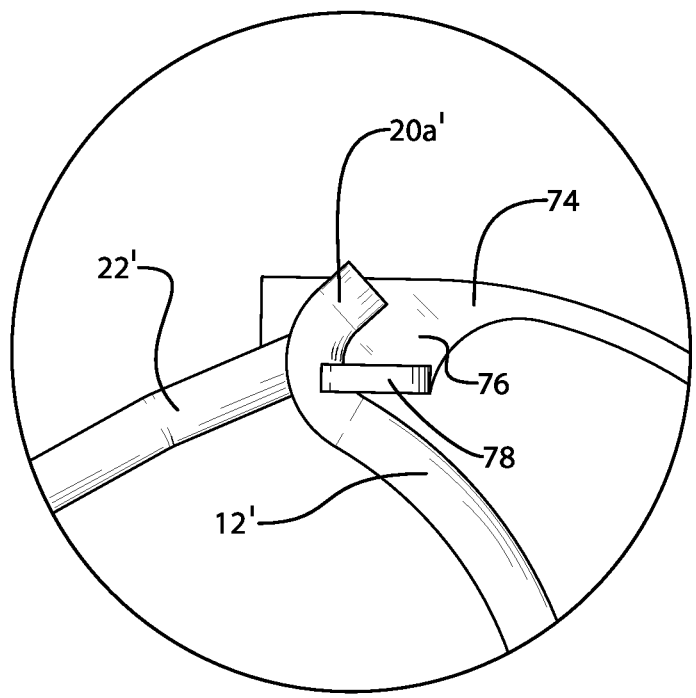
FIG. 20 is an enlarged top view illustrating the manner in which the bent end portion of the first clamp component interacts with the outwardly protruding tab portion of the handle component (Detail "B")

In the alternative illustrative embodiment depicted in FIGS. 18-20, the clamping device 10' includes a slightly modified version of the first clamp component 12', a slightly modified version of the second clamp component 22', and a stamped handle component 74. As shown in FIGS. 18 and 19, the handle component 74 comprises a pair of rear support tab portions 76 and a pair of outwardly protruding tab portions 78. In the alternative embodiment, rather than bent end portions 26a, 26b, the second clamp component 22' comprises a pair of inwardly bent connecting ends 80 coupled to the rear support tab portions 76 of the handle component 74. More specifically, each of the inwardly bent connecting ends 80 of the second clamp component 22' is rotatably coupled to a respective one of the rear support tab portions 76 of the handle component 74 (see FIG. 19) so that the handle component 74 is able to rotate relative to the second clamp component 22' in a similar manner as the handle component 28 described above.

With combined reference to FIGS. 19 and 20, in the illustrative embodiment, it can be seen that, when the clamping device 10' is in its engaged, closed position, the bent end portions 20a', 20b' of the first clamp component 12 are configured to be engaged with respective outwardly protruding tab portions 78 of the handle component 74. The detail view (Detail "B") depicted in FIG. 20 illustrates the manner in which the bent end portions 20a', 20b' of the first clamp component 12' interact with the outwardly protruding tab portions 78 of the handle component 74 in the engaged, closed position of the clamping device 10'.

In another alternative embodiment, the handle component of the clamping device may be injection-molded, rather than being formed from bent wire or stamped.

Figure 12:
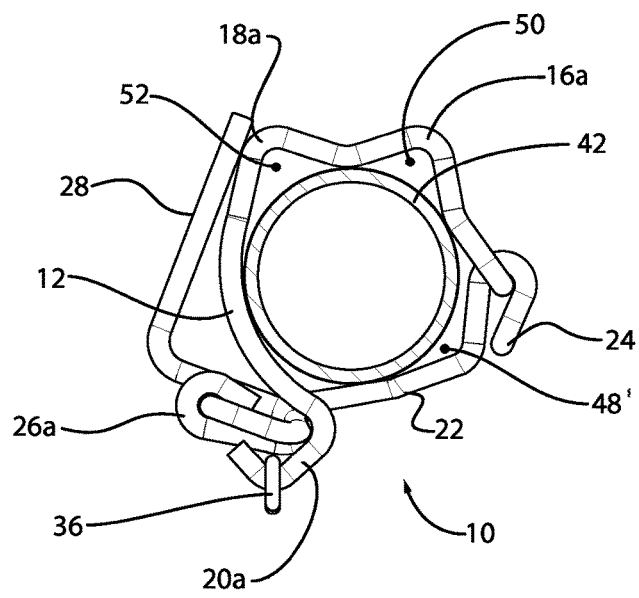
FIG. 12 is yet another top plan view of the clamping device of FIG. 1 illustrating a fourth and final stage of the attachment process of the clamping device.

In the illustrative embodiment, referring again to FIGS. 1 and 8, the clamping device 10 further comprises a locking pin member 36 configured to be inserted between the first clamp component 12 and the second clamp component 22 (see e.g., FIGS. 1 and 12). The locking pin member 36 is configured to prevent the handle component 28 from being rotated in the second loosening direction so as to prevent the clamping device 10 from being disengaged from the pole 42 (i.e., in FIG. 12, the locking pin member 36 prevents the handle component 28 from being rotated in a counterclockwise loosening direction). Referring to the exploded perspective view of FIG. 8, it can be seen that, in the illustrative embodiment, the locking pin member 36 comprises a generally straight inner pin portion 38 and an outer grasping portion 40. The inner pin portion 38 of the locking pin member 36 is configured to be inserted between the first clamp component 12 and the second clamp component 22 in the pin receiving gap 62 (e.g., as shown in Detail "A" in FIG. 14), and the outer grasping portion 40 of the locking pin member 36 is configured to be grasped by a user to facilitate an insertion of the locking pin member 36 into the clamping device 10, or removal of the locking pin member 36 from the clamping device 10.

Also, in the illustrative embodiment, with reference again to FIGS. 1 and 8, it can be seen that the at least one offset portion of the first clamp component 12 of the clamping device 10 comprises a plurality of offset portions or bumpouts 16a, 16b, 18a, 18b (i.e., a first pair of upper and lower offset portions 16a, 16b and a second pair of upper and lower offset portions 18a, 18b). Each of the plurality of offset portions 16a, 16b and 18a, 18b defines a respective accessory receiving space 50, 52 (see FIG. 12) for receiving an attachment portion of an accessory (e.g., the attachment wires 56 of the accessory 54 in FIG. 13 or the attachment wires 60 of the accessory 58). In the illustrative embodiment, a first one of the attachment wires 56 or 60 is received within the first accessory receiving space 50, while a second one of the attachment wires 56 or 60 is received within the second accessory receiving space 52. In one exemplary embodiment, the legs of the offset portions 16a, 16b, 18a, 18b may form an angle between 80 degrees and 100 degrees, inclusive (see FIG. 21). More specifically, in one exemplary embodiment, the legs of the offset portions 16a, 16b, 18a, 18b may form an angle approximately equal to 85 degrees.

However, in other embodiments, different angles may be used for the offset portions 16a, 16b, 18a, 18b. Also, in other embodiments, the offset portions 16a, 16b, 18a, 18b may be formed using different shapes than that which is depicted in the illustrative embodiment (e.g., a bump-out with a semi-circular shape, rather than a triangular shape). In addition, in yet other embodiments, the clamping device 10 may be provided with a greater quantity of offset portions or bump-outs (e.g., one (1) bump-out or three (3) bump-outs, rather than two (2) bump-outs that are illustrated).

Figure 13:
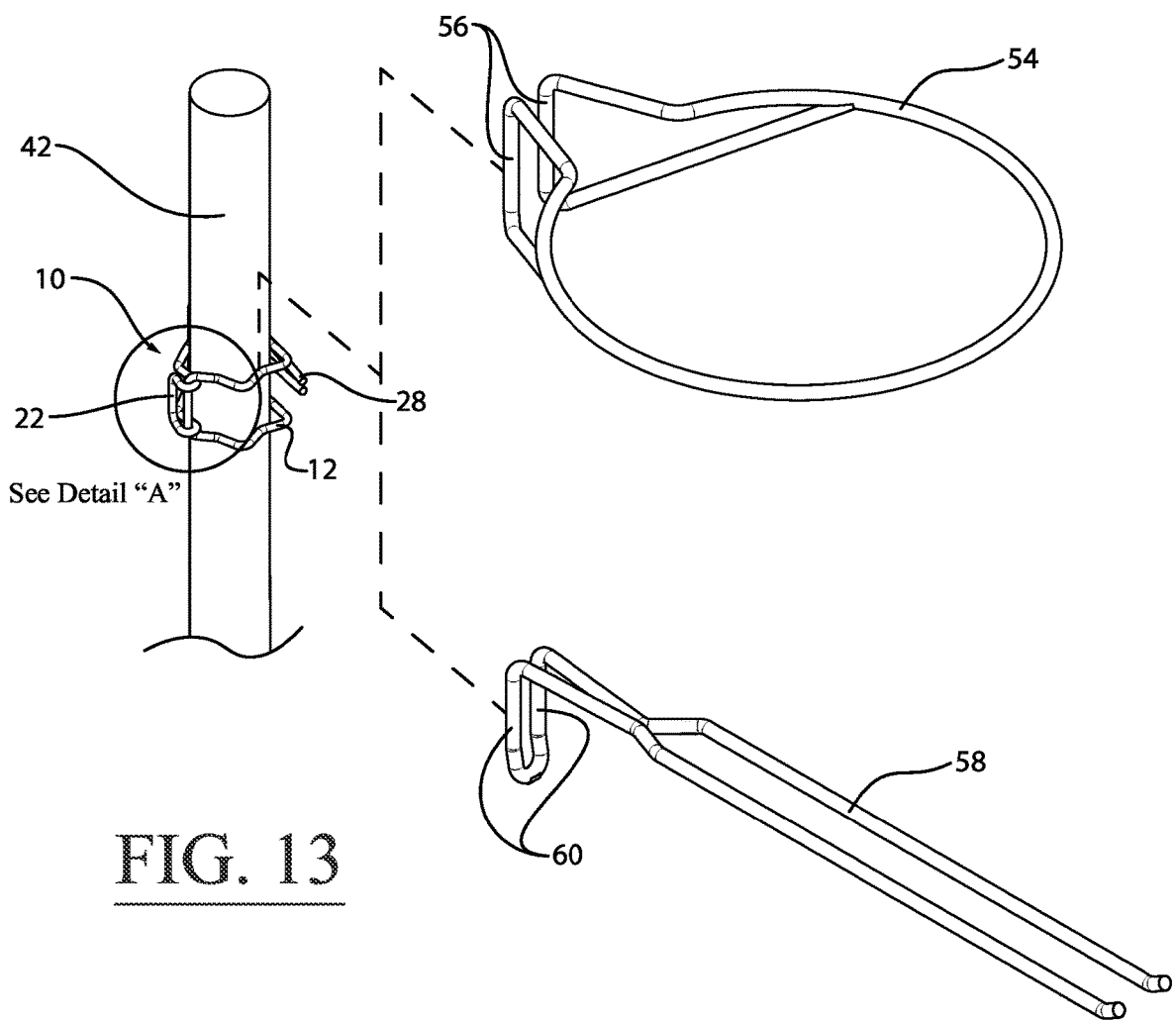
FIG. 13 is a perspective view illustrating several accessories that are able to be attached to a pole using the clamping device of FIG. 1.
Figure 14:
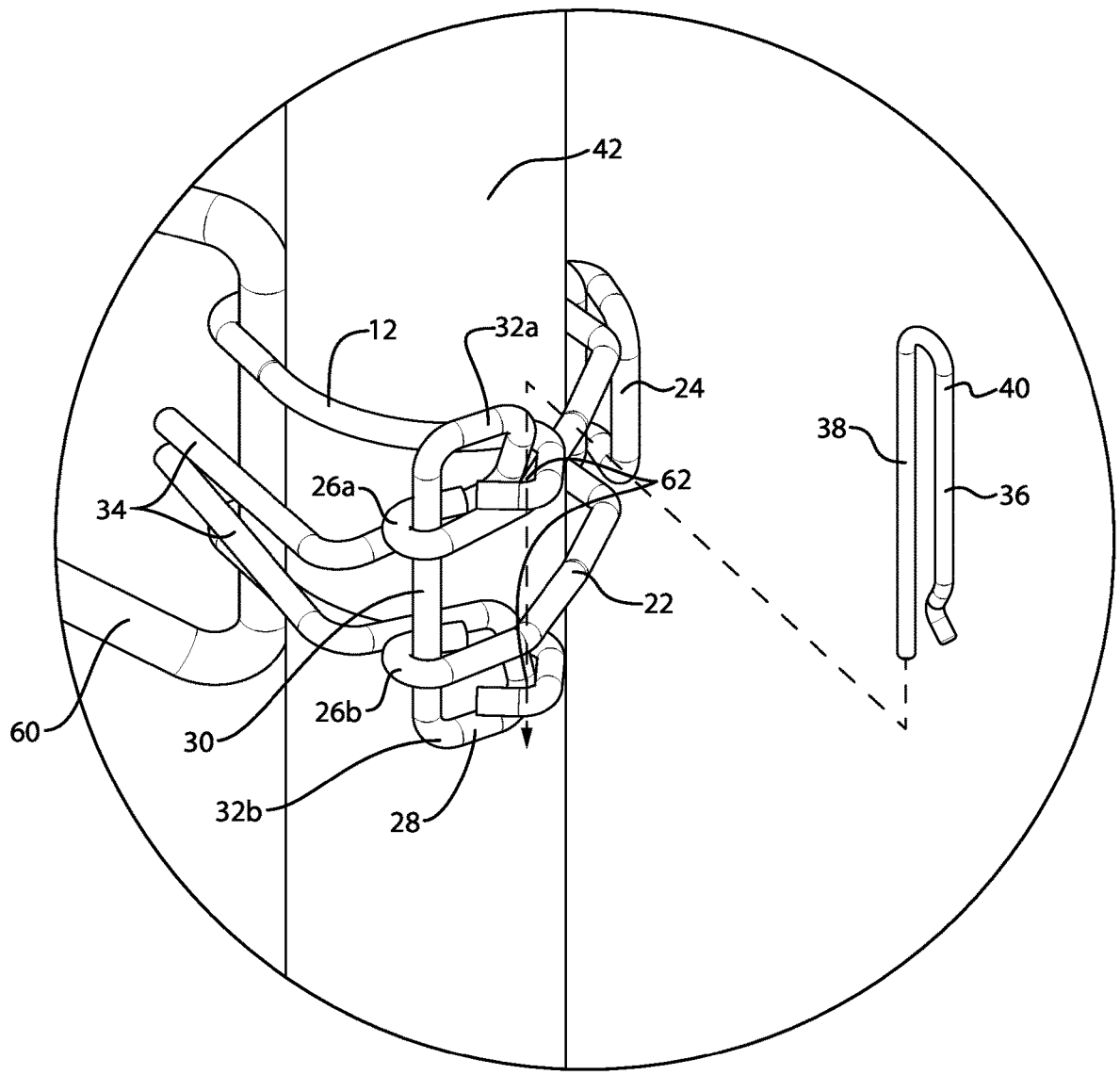
FIG. 14 is a perspective view illustrating the manner in which the locking pin member is inserted into the clamping device (Detail "A")
Figure 15:
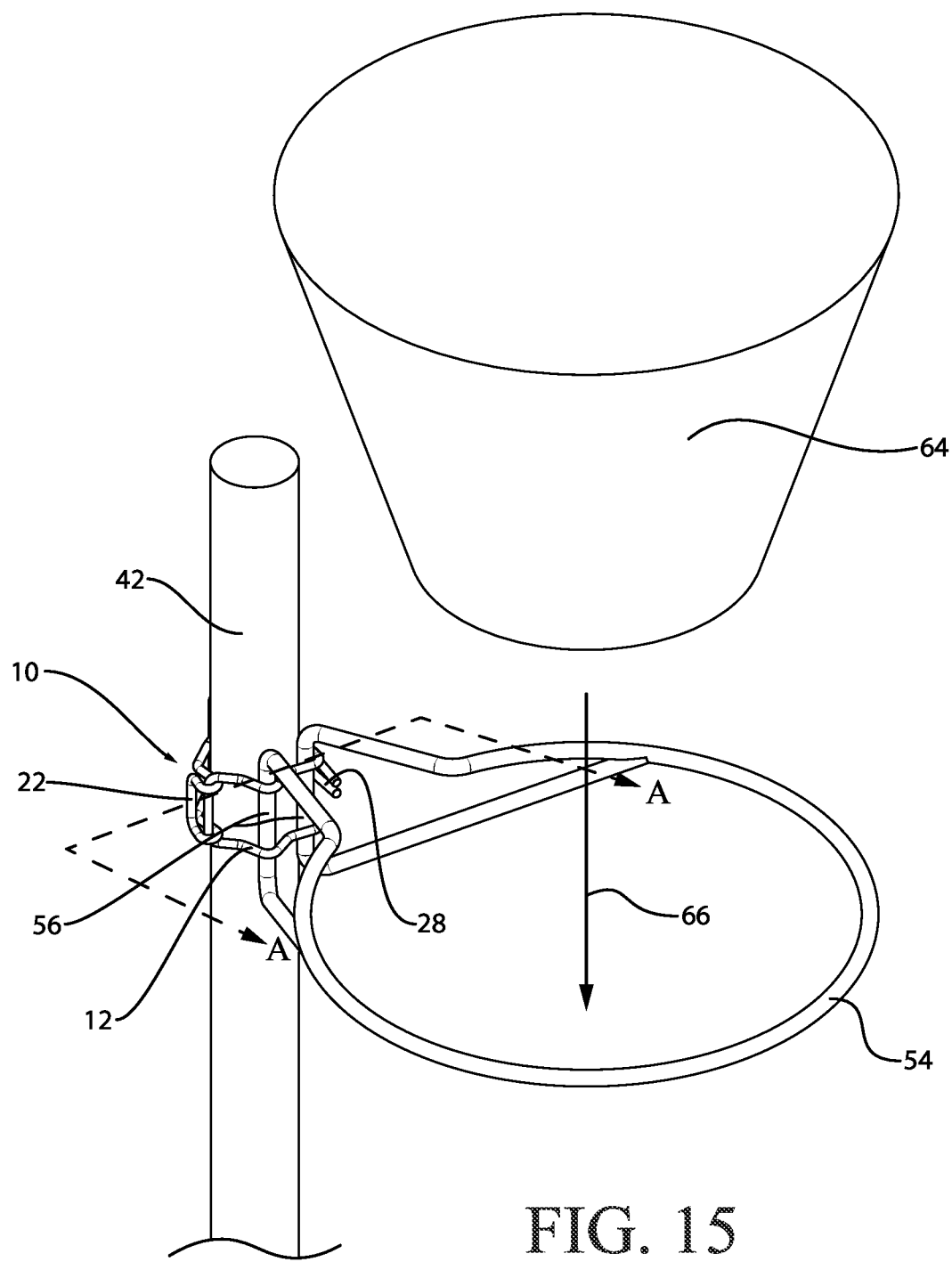
FIG. 15 is a perspective view illustrating the clamping device of FIG. 1 being used with a plant stand accessory.
Figure 16:
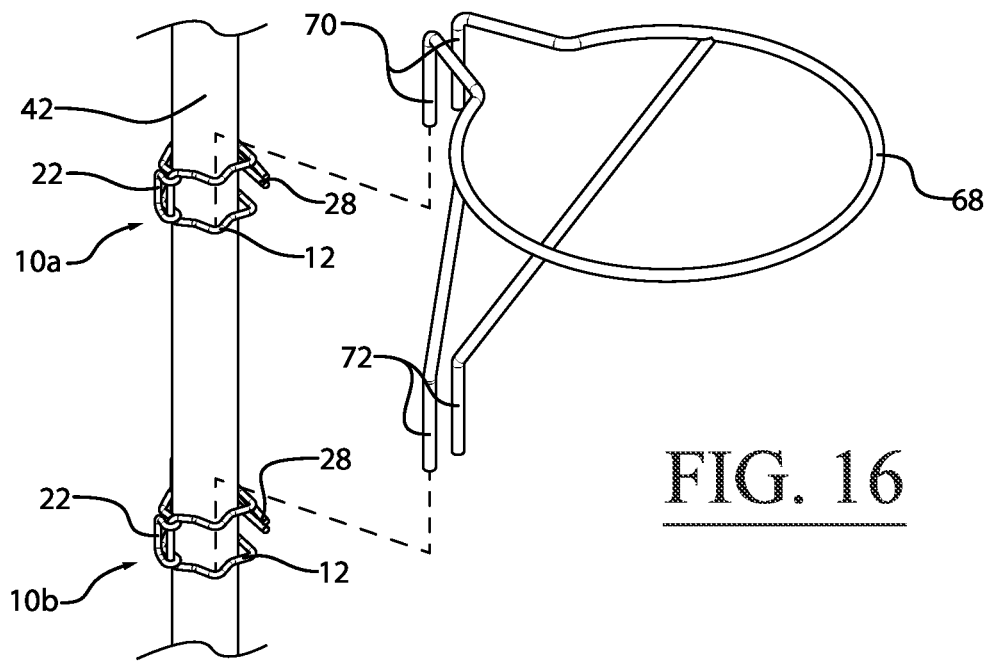
FIG. 16 is a perspective view illustrating the clamping device of FIG. 1 being used with another plant stand accessory that bridges two clamping devices.
Figure 17:
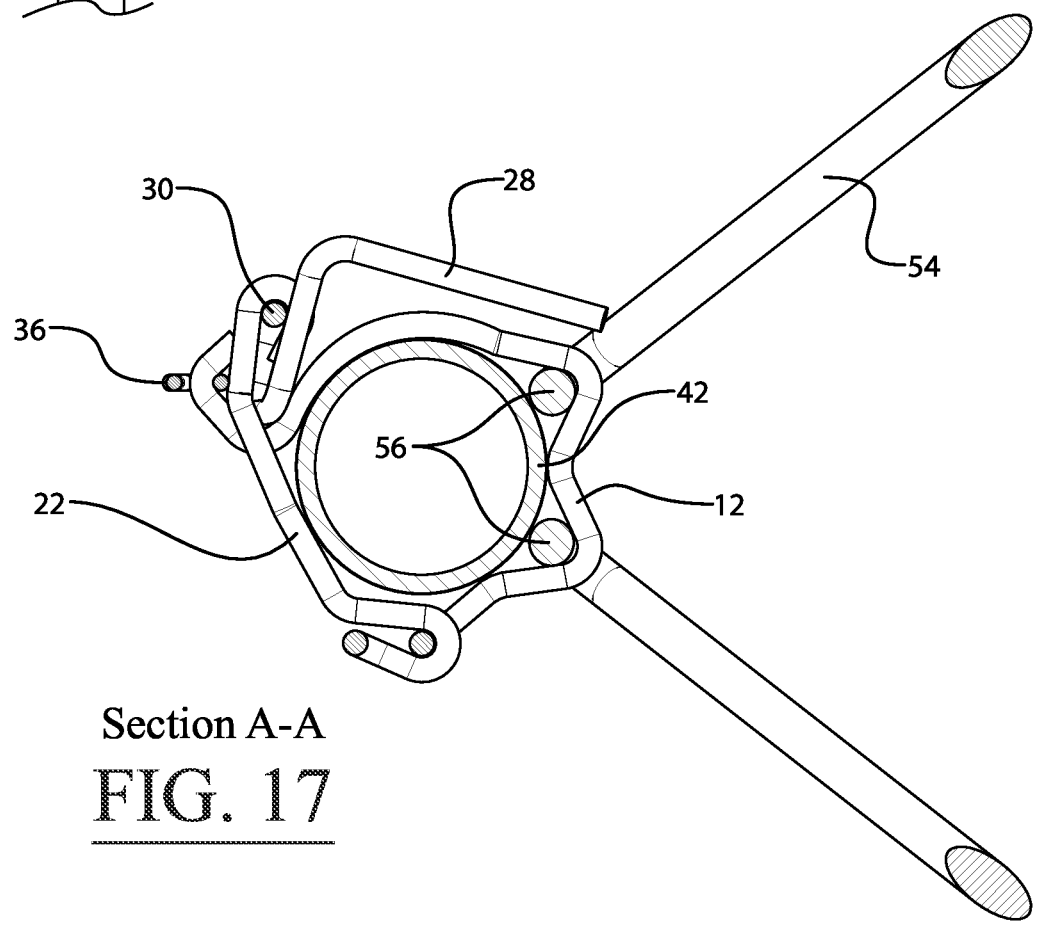
FIG. 17 is a transverse sectional view cut through the assembly depicted in the perspective view of FIG. 15.

Now, several exemplary accessories 54, 58, 68 that may be used with the illustrative clamping device 10 will be described with reference to FIGS. 13 and 15-17. Initially, as shown in FIG. 13, a plant stand accessory 54 formed from bent wire may be attached to the pole 42 using the clamp device 10. More specifically, the attachment wires 56 of the plant stand accessory 54 are received with accessory receiving spaces 50, 52 defined by the offset portions 16a, 16b and 18a, 18b of the first clamp component 12 of the clamping device 10. In FIG. 15, the plant stand accessory 54 is depicted after it has been attached to the pole 42 using the clamp device 10 (i.e., after the clamp device 10 has been locked in place). A plant pot 64 is shown being inserted into the plant stand accessory 54 depicted in FIG. 15 (i.e., the direction of insertion of the plant pot 64 into the plant stand accessory 54 is diagrammatically represented by the arrow 66 in FIG. 15). Also, as shown in FIG. 13, a hanger support accessory 58 formed from bent wire may be attached to the pole 42 using the clamp device 10. More specifically, the attachment wires 60 of the hanger support accessory 58 are received with accessory receiving spaces 50, 52 defined by the offset portions 16a, 16b and 18a, 18b of the first clamp component 12 of the clamping device 10. In addition, as shown in FIG. 16, a plant stand accessory 68 bridging two (2) clamping devices 10a, 10b may be attached to the pole 42. Like the plant stand accessory 54, the plant stand accessory 68 is formed from bent wire, and is designed to support a plant pot. However, unlike the plant stand accessory 54 depicted in FIGS. 13 and 15, the plant stand accessory 68 is attached to the pole using two (2) clamping devices 10a, 10b (see FIG. 16), rather than just a single clamping device 10. More specifically, as shown in FIG. 16, the first set of attachment wires 70 of the plant stand accessory 68 are received with accessory receiving spaces 50, 52 of the upper clamping device 10a, and the second set of attachment wires 72 of the plant stand accessory 68 are received with accessory receiving spaces 50, 52 of the lower clamping device 10b.

Figure 9:
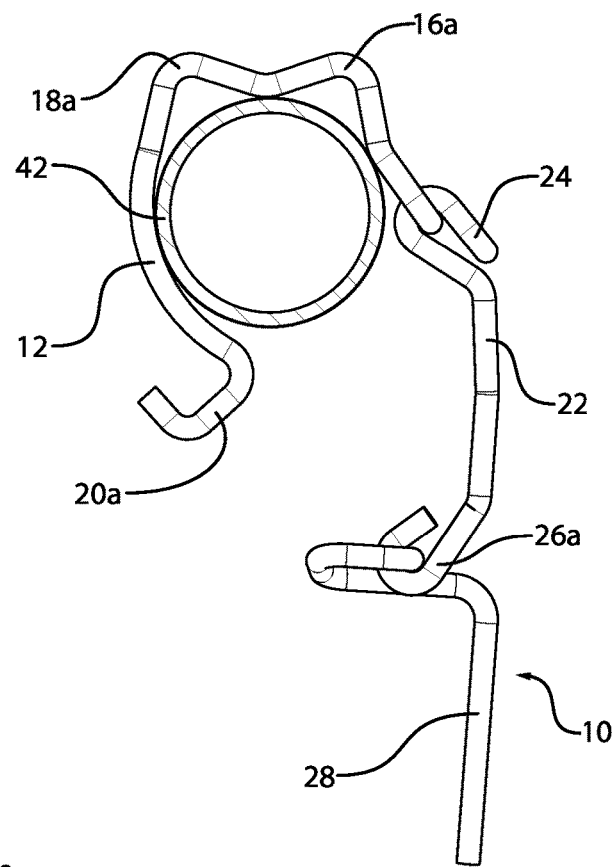
FIG. 9 is another top plan view of the clamping device of FIG. 1 illustrating a first stage of the attachment process of the clamping device.
Figure 10:
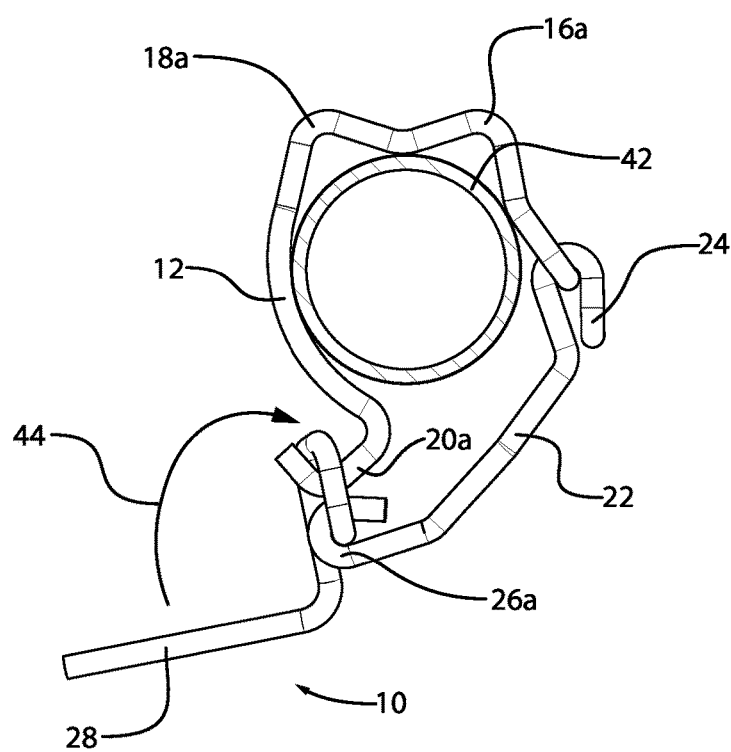
FIG. 10 is yet another top plan view of the clamping device of FIG. 1 illustrating a second stage of the attachment process of the clamping device.
Figure 11:
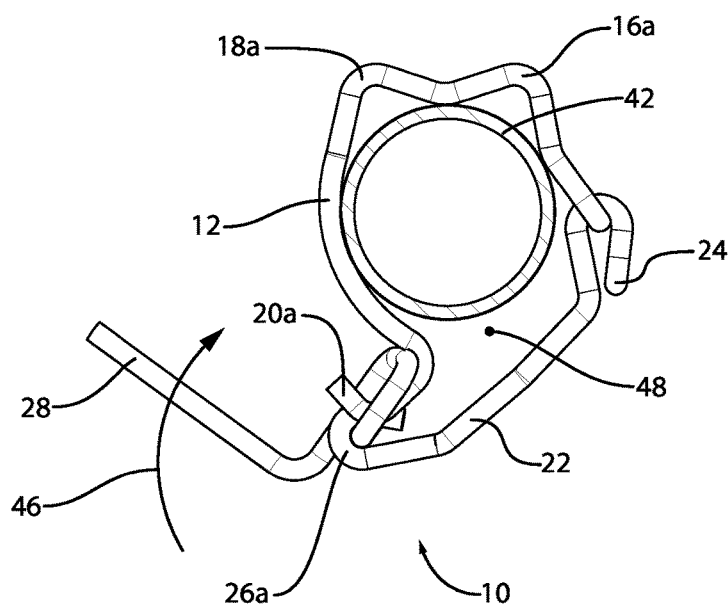
FIG. 11 is still another top plan view of the clamping device of FIG. 1 illustrating a third stage of the attachment process of the clamping device.

Next, with reference to FIGS. 9-12, an illustrative manner in which the clamping device 10 is attached to a pole 42 will be described. First, as shown in FIG. 9, the first clamp component 12 of the clamping device 10 is attached to the pole 42. In the illustrative embodiment, the first clamp component 12 is designed to frictionally engage the pole 42 so that the clamping device 10 stays in place prior to the first clamp components 12, 22 being engaged with one another. Also, in the first step illustrated in FIG. 9, the accessory 54, 58, 68 is preferably attached to the clamping device 10. Secondly, as shown in FIG. 10, a user begins applying a rotational force to the handle component 28 (as diagrammatically represented by the curved arrow 44 in FIG. 10) so as to begin closing the clamping device 10. When the rotational force is initially applied to the handle component 28, the clamping device 10 is not yet generating cam pressure to assist in the closing of the clamp 10. Thirdly, as shown in FIG. 11, the user continues to apply a rotational force to the handle component 28 (as diagrammatically represented by the curved arrow 46 in FIG. 11) to continue closing the clamping device 10. When the subsequent rotational force is being applied by the user in the third step of FIG. 11, the clamping device 10 is now generating cam pressure to assist in the closing of the clamp 10. Also, in the third step of FIG. 11, the gap 48 between the pole 42 and the second clamp component 22 is beginning to get gradually smaller as the handle component 28 is rotated in the clockwise closing direction 46. Finally, as shown in FIG. 12, once the handle component 28 has been completely rotated to its furthest clockwise position, the clamping device 10 is disposed in its fully closed position. In the fully closed position of FIG. 12, only a slight gap 48' exists between a portion of the pole 42 and the second clamp component 22. As shown in FIG. 12, the clamping device 10 frictionally engages the sidewall of the pole 42 in multiple circumferential regions so that the clamping device 10 is securely attached to the pole 42 (see FIG. 17). Once the clamping device 10 is in its fully closed position of FIG. 12, the locking pin member 36 is inserted to prevent the handle component 28 from being rotated in the loosening direction so as to prevent the clamping device 10 from being disengaged from the pole 42 (i.e., in FIG. 12, the locking pin member 36 prevents the handle component 28 from being rotated in a counterclockwise loosening direction).

As described above, the clamping device 10, 10' may be used for securing a single leg or a double leg accessory to a pole 42 by encompassing the leg(s) between the clamp 10, 10' and the outer wall of the pole 42. In the illustrative embodiment, the clamping device 10, 10' is comprised of three (3) interacting metal wire forms 12, 22, 28 adapted for: (a) press fit to the outer diameter of the pole 42, (b) wrapping of the pole 42 to form a band around the entire circumference, and (c) a leveraged engagement of various contact points and built-in tolerances to provide adequate bracing of the pole 42 and the chosen accessory. In the illustrative embodiment, the grip force on the pole 42 is amplified by the handle component 28 (e.g., a pivoting latch lever) and safely secured by specific placement of accompanying locking pin member 36 (e.g., a cotter pin).

Figure 22:
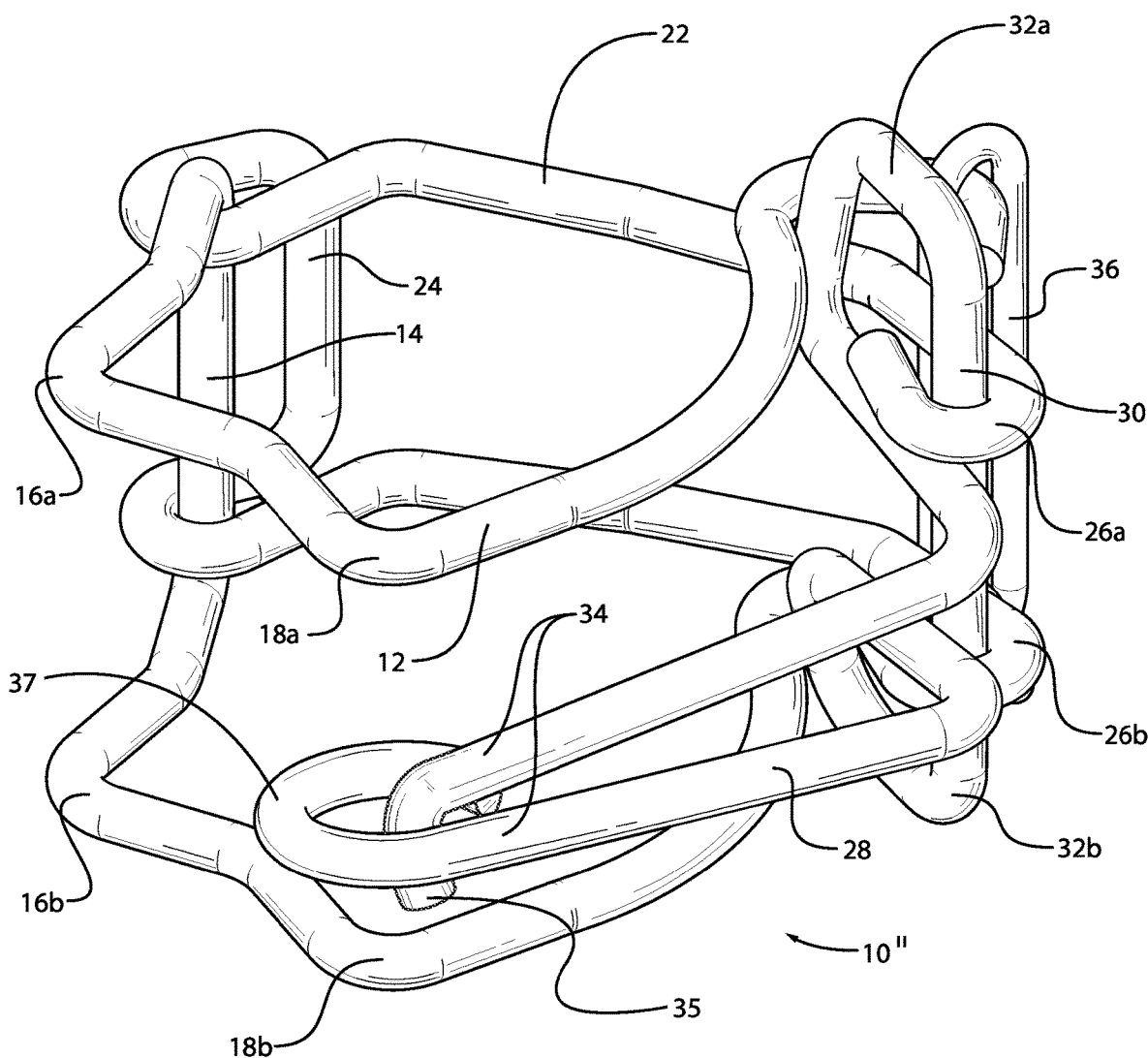
FIG. 22 is a perspective view of yet another clamping device, according to another alternative embodiment of the invention, wherein the ends of the handle component have a different configuration.

In the alternative illustrative embodiment depicted in FIG. 22, the clamping device 10" includes a slightly modified version of the handle component 28. In particular, as shown in FIG. 22, the handle component 28 has a first bent free end 35 that is received within a second looped free end 37. Advantageously, the configuration of the handle ends 35, 37 provides the handle component 28 with additional stability, and the handle ends 35, 37 provide the handle component 28 with a more refined appearance and prevent any protruding sharp edges.

Figure 23:
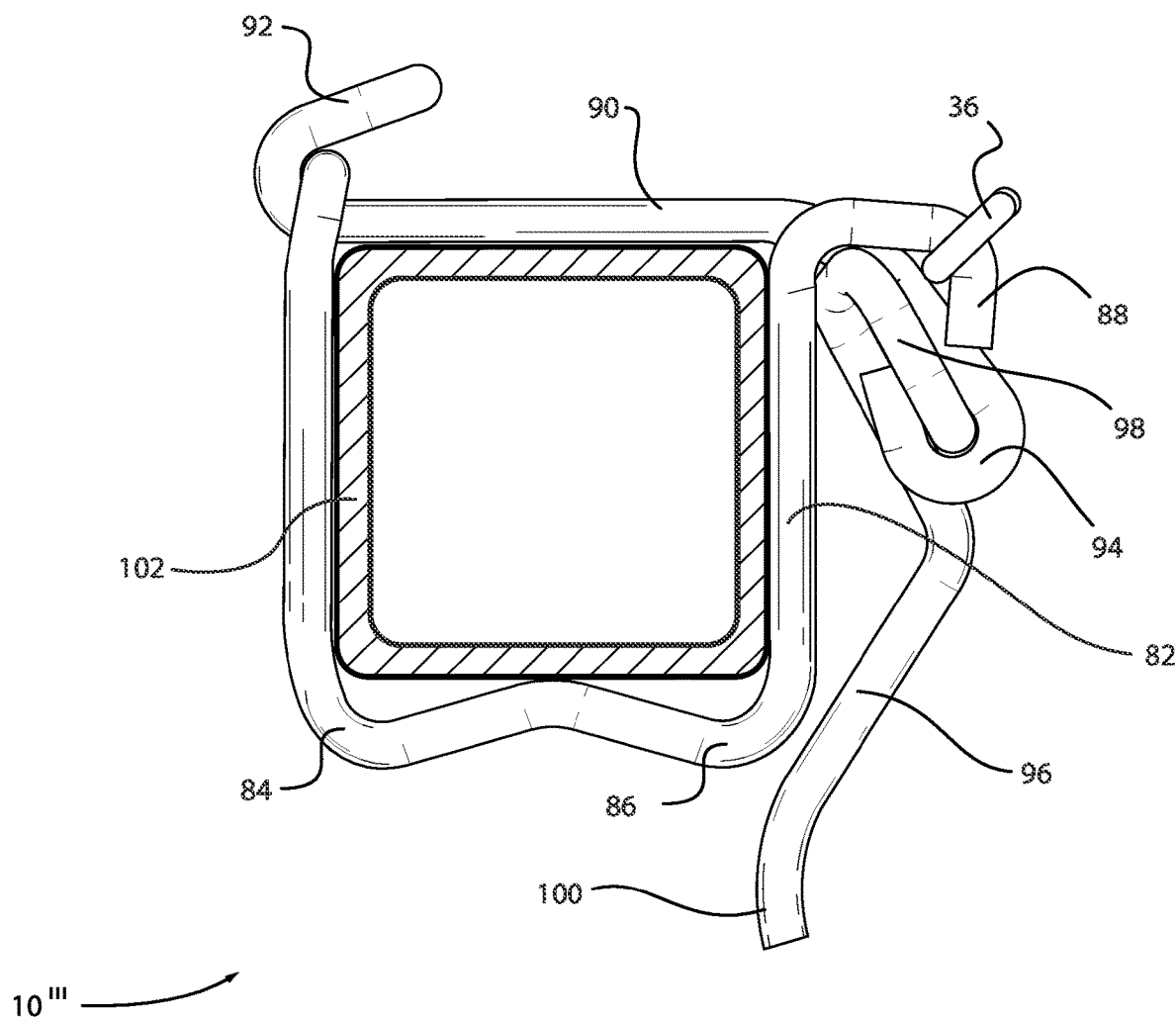
FIG. 23 is a perspective view of still another clamping device, according to yet another alternative embodiment of the invention, wherein the clamping device is configured to fit a pole having a square cross-section, rather than a circular cross-section.

In the alternative illustrative embodiment depicted in FIG. 23, the clamping device 10'" is configured to fit a pole 102 having a square cross-section, rather than a circular cross-section Like the clamping device 10 described above, the clamping device 10'" of FIG. 23 generally comprises a first clamp component 82 formed from bent wire, the first clamp component 82 configured to partially circumscribe the square pole 102 (see FIG. 23), and the first clamp component 82 including a plurality of offset portions 84, 86 for defining an accessory receiving space between the first clamp component 82 and a sidewall of the square pole 102 (refer to FIG. 23); a second clamp component 90 rotatably coupled to the first clamp component 82, the second clamp component 90 formed from bent wire, and the second clamp component 90 configured to partially circumscribe the square pole 102 (see FIG. 23); and a handle component 96 configured to couple the second clamp component 90 to the first clamp component 82; wherein, when the handle component 96 is rotated in a first tightening direction, the first clamp component 82 and the second clamp component 90 are brought into secure engagement about the circumference of the square pole 102; and wherein, when the handle component 96 is rotated in a second loosening direction, the clamping device 10' is capable of being disengaged from the square pole 102. Like the first clamp component 12 of the clamping device 10 described above, the first clamp component 82 of the clamping device 10' comprises a bent end portion(s) 88. Also, similar to the second clamp component 22 of the clamping device 10 described above, the second clamp component 90 of the clamping device 10' comprises a looped end portion 92 and an opposite bent end portion(s) 94. Also, in the alternative embodiment of FIG. 23, similar to the clamping device 10 described above, the handle component 96 of the clamping device 10''' comprises a looped end portion(s) 98 and a free end portion(s) 100. In the alternative embodiment of FIG. 23, the free end portion(s) 100 of the handle component 96 may include a finger push tab to assist in the opening of the clamping device 10'''. Also, like the clamping device 10 described above, the clamping device 10''' further comprises a locking pin member 36 to prevent the handle component 96 from being rotated in the second loosening direction.

It is readily apparent that the aforedescribed clamping device 10, 10', 10", 10' offers numerous advantages. First, the clamping device 10, 10', 10", 10''' is capable of being used for supporting, suspending, and securing many different types of accessories 54, 58, 68 to a pole 42, 102 (see e.g., FIGS. 13 and 16). Secondly, the clamping device 10, 10', 10", 10''' is capable of being singularly and temporarily attached to a pole 42, 102 (refer to FIGS. 9-12 and 23). Finally, the clamping device 10, 10', 10", 10''' is capable of being attached to a pole 42, 102 without access to the ends of the pole, modification of the pole, or tools of any kind (see FIGS. 9-12 and 23).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention. For example, rather than being configured to fit a pole 42, 102 with a circular cross-section or a square cross-section as depicted in the illustrative embodiments, the clamping device 10 may be configured to fit a pole having other cross-sectional shapes (e.g., oval, etc.). Also, the clamping device 10 may be formed in variety of different sizes so as to fit different-sized poles.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A clamping device for securing an accessory to a pole, the clamping device comprising:
    a first clamp component formed from bent wire, the first clamp component configured to partially circumscribe a pole, and the first clamp component including at least one offset portion for defining an accessory receiving space between the first clamp component and a sidewall of the pole, the first clamp component further including at least one first bent end portion, and the at least one first bent end portion including a distal free end;
    a second clamp component rotatably coupled to the first clamp component, the second clamp component formed from bent wire, and the second clamp component configured to partially circumscribe the pole, and the second clamp component including at least one second bent end portion; and
    a handle component configured to couple the second clamp component to the first clamp component, the handle component being rotatably coupled to the at least one second bent end portion of the second clamp component, and the handle component being configured to be removably engaged with the at least one first bent end portion of the first clamp component so as to couple the second clamp component to the first clamp component about the pole; wherein, when the handle component is rotated in a first tightening direction, the first clamp component and the second clamp component are brought into secure engagement about the circumference of the pole; and wherein, when the handle component is rotated in a second loosening direction, the clamping device is capable of being disengaged from the pole, and the at least one first bent end portion of the first clamp component is configured to be separated from the handle component such that the distal free end of the at least one first bent end portion is spaced apart from the handle component by a gap.

2. The clamping device according to claim 1, wherein the first clamp component further comprises a first looped end portion, and the second clamp component further comprises a second looped end portion, and wherein the second clamp component is rotatably coupled to the first clamp component by means of the engagement between the second looped end portion and the first looped end portion.

3. The clamping device according to claim 1, wherein the handle component further comprises a pivot rod portion, the pivot rod portion of the handle component rotatably coupled to the at least one second bent end portion of the second clamp component.

4. The clamping device according to claim 3, wherein the handle component further comprises at least one looped portion, the at least one first bent end portion of the first clamp component configured to be engaged with the at least one looped portion of the handle component during the securement of the clamping device on the pole.

5. The clamping device according to claim 1, wherein the handle component further comprises at least one rear support tab portion, the at least one second bent end portion of the second clamp component rotatably coupled to the at least one rear support tab portion of the handle component.

6. The clamping device according to claim 5, wherein the handle component further comprises at least one outwardly protruding tab portion, the at least one first bent end portion of the first clamp component configured to be engaged with the at least one outwardly protruding tab portion of the handle component.

7. The clamping device according to claim 1, wherein the at least one offset portion of the first clamp component comprises a plurality of offset portions, each of the plurality of offset portions defining a respective accessory receiving space for receiving an attachment portion of an accessory.

8. A clamping system, comprising:

a pole;

an accessory for supporting an object on the pole, the accessory comprising at least one attachment portion; and a clamping device for securing the accessory to the pole, the clamping device including:

a first clamp component formed from bent wire, the first clamp component configured to partially circumscribe the pole, and the first clamp component including at least one offset portion for defining an accessory receiving space between the first clamp component and a sidewall of the pole;

a second clamp component rotatably coupled to the first clamp component, the second clamp component formed from bent wire, and the second clamp component configured to partially circumscribe the pole; and a handle component configured to couple the second clamp component to the first clamp component; wherein, when the handle component is rotated in a first tightening direction, the first clamp component and the second clamp component are brought into secure engagement about the circumference of the pole; and wherein, when the handle component is rotated in a second loosening direction, the clamping device is capable of being disengaged from the pole;

wherein the at least one attachment portion of the accessory is configured to be removably received within the accessory receiving space defined by the at least one offset portion of the first clamp component, and the at least one attachment portion is configured to longitudinally extend along a length of the pole.

9. The clamping system according to claim 8, wherein the accessory comprises a plant stand accessory for supporting a plant pot.

10. The clamping system according to claim 8, wherein the accessory comprises a hanger support accessory.

11. The clamping system according to claim 8, wherein the first clamp component of the clamping device further comprises a first looped end portion, and the second clamp component further comprises a second looped end portion, and wherein the second clamp component is rotatably coupled to the first clamp component by means of the engagement between the second looped end portion and the first looped end portion.

12. The clamping system according to claim 8, wherein the first clamp component of the clamping device further comprises at least one first bent end portion, and the second clamp component further comprises at least one second bent end portion, wherein the handle component is rotatably coupled to the at least one second bent end portion of the second clamp component, and wherein the handle component is configured to be removably engaged with the at least one first bent end portion of the first clamp component so as to couple the second clamp component to the first clamp component about the pole.

13. The clamping system according to claim 12, wherein the handle component of the clamping device further comprises a pivot rod portion, the pivot rod portion of the handle component rotatably coupled to the at least one second bent end portion of the second clamp component.

14. The clamping system according to claim 13, wherein the handle component of the clamping device further comprises at least one looped portion, the at least one first bent end portion of the first clamp component configured to be engaged with the at least one looped portion of the handle component during the securement of the clamping device on the pole.

15. The clamping system according to claim 12, wherein the handle component of the clamping device further comprises at least one rear support tab portion, the at least one second bent end portion of the second clamp component rotatably coupled to the at least one rear support tab portion of the handle component.

16. The clamping system according to claim 15, wherein the handle component of the clamping device further comprises at least one outwardly protruding tab portion, the at least one first bent end portion of the first clamp component configured to be engaged with the at least one outwardly protruding tab portion of the handle component.

17. The clamping system according to claim 8, wherein the at least one offset portion of the first clamp component of the clamping device comprises a plurality of offset portions, each of the plurality of offset portions defining a respective accessory receiving space for receiving the at least one attachment portion of the accessory.

* * * * *